Patented Oct. 5, 1948

2,450,632

UNITED STATES PATENT OFFICE 2,450,632

PRODUCTION OF NITRILES

Hamilton P. Caldwell, Jr., and Harold D. Chapman, Woodbury, N. J., assignors to Socony-Vacuum Oil Company, Incorporated, a corporation of New York No Drawing. Application January 16, 1946, Serial No. 641,640

12 Claims. (Cl. 260—465)

This invention relates to a process for producing nitriles, and is more particularly concerned with a catalytic process for producing nitriles from hydrocarbons.

Nitriles are organic compounds containing combined nitrogen. Their formula may be represented thus: R—C≡N, in which R is an aryl or an alkyl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles containing at least two carbon atoms can be prepared by reacting hydrocarbons having at least two carbon atoms and containing at least one carbon atom to which at least two hydrogen atoms are attached, with ammonia at elevated temperatures, in the presence of molybdenum oxide or tungsten oxide.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms. Another object is to afford a catalytic process for the production of nitriles containing at least two carbon atoms. An important object is to provide a process for producing nitriles containing at least two carbon atoms which is inexpensive and commercially feasible. A specific object is to provide a process for producing nitriles containing at least two carbon atoms from hydrocarbons having at least two carbon atoms and containing at least one carbon atom to which at least two hydrogen atoms are attached. Other objects and advantages of the present invention will become apparent to those skilled in the art from the following description.

Broadly stated, our invention provides an inexpensive and commercially feasible process for the production of nitriles containing at least two carbon atoms, which comprises reacting a hydrocarbon having at least two carbon atoms and containing at least one carbon to which at least two hydrogen atoms are attached, with ammonia, in the gaseous phase and at elevated temperatures, in the presence of catalytic material containing a metal oxide selected from the group consisting of molybdenum oxide and tungsten oxide.

Generally speaking, any hydrocarbon having at least two carbon atoms and containing at least one carbon atom to which at least two hydrogen atoms are attached is suitable as the hydrocarbon reactant in the process of our invention. For example, any hydrocarbon containing at least two carbon atoms and at least one methylene group (—CH₂—) or one methyl group will produce nitriles in accordance with our process. Accordingly, in the preferred embodiment of the present invention, i. e., the production of aromatic mononitriles, we use alkyl-substituted aromatic hydrocarbons, and ordinarily, the methyl-substituted aromatic hydrocarbons.

The alkyl-substituted aromatic hydrocarbons to be used in the process of our invention may be derived from any suitable source as is well known to those familiar with the art. Any alkyl-substituted aromatic hydrocarbon may be employed for our purpose, but we prefer to use the alkyl-substituted aromatic hydrocarbons in which the alkyl substituent or at least one of the alkyl substituents is unsaturated, and more particularly, the thus alkyl-substituted benzenes. Examples are toluene, xylenes, and trimethyl benzenes, and an example of those especially preferred is styrene. It is to be understood, however, that hydrocarbon fractions containing alkyl-substituted benzenes may also be utilized in our process. It is to be understood also, that other alkyl-substituted aromatic hydrocarbons, such as methyl-substituted naphthalenes, and fractions containing the same may be employed in the present process.

The proportions of reactants, i. e., hydrocarbon and ammonia, used in our process may be varied over a wide range with little effect on the conversion per pass and ultimate yield. In general, the charge of reactants may contain as little as 2 mol. per cent or as much as 98 mol. per cent of hydrocarbons. In practice, however, we use charges containing between about 20 mol. per cent and about 90 mol. per cent of hydrocarbon, and ordinarily, we prefer to use charges containing a molar excess of ammonia over the hydrocarbon reactant.

We have found that the catalysts to be used to produce nitriles containing at least two carbon atoms, by reacting hydrocarbons having at least two carbon atoms and containing at least one carbon atom to which at least two hydrogen atoms are attached, with ammonia, are those containing a molybdenum oxide or a tungsten oxide, such as molybdenum sesquioxide ($Mo_2O_3$), molybdenum dioxide ($MoO_2$), molybdenum trioxide ($MoO_3$), molybdenum pentoxide ($Mo_2O_5$), tungsten dioxide ($WO_2$) and tungsten trioxide ($WO_3$). Therefore, and in the interest of brevity, it must be clearly understood that when we speak of molybdenum oxide or tungsten oxide herein and in the claims, we have reference to the various oxides of molybdenum and tungsten. While all of these metal oxides are operative in the present process, they are not equivalent in their effectiveness from the standpoint of catalytic activity, tungsten dioxide ($WO_2$), for example, being far less effective than molybdenum trioxide ($MoO_3$), the latter being the preferred starting catalytic material.

While these metal oxides exhibit different degrees of effectiveness when used per se, they generally possess additional catalytic activity when used in conjunction with the well known supports, such as alumina, silica gel, carborundum, pumice, clays, and the like. We especially prefer to use alumina ($Al_2O_3$) as a support, and we have found that a catalyst comprising a molybdenum oxide supported on alumina is particularly useful for our purpose. Without any intent of limiting the scope of the present invention, it is suspected that the enhanced catalytic activity of the supported catalysts is attributable primarily to their relatively large surface area.

The concentration of catalytic metal oxide in the supported catalysts influences the conversion per pass. In general, the conversion per pass increases with increase in the concentration of metal oxide. For example, we have found that a catalyst comprising 30 parts by weight of molybdenum trioxide on 70 parts by weight of alumina is more effective than one comprising 10 parts by weight of molybdenum trioxide on 90 parts by weight of alumina. It is to be understood, however, that supported catalysts containing larger or smaller amounts of the catalytic metal oxides may be used in our process.

We have found also that in order to obtain initial maximum catalytic efficiency, particularly where the catalytic material comprises the higher catalytic metal oxides, that the catalysts should be conditioned prior to use in the process. As defined herein, conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our process when the catalyst comes in contact with the ammonia reactant.

In operation, the catalysts become fouled with carbonaceous material which ultimately affects the catalytic activity of the catalyst. Accordingly, when the efficiency of the catalyst declines to a point where further operation becomes uneconomical or disadvantageous from a practical standpoint, the catalyst may be regenerated as is well known in the art, by subjecting the catalyst to a careful oxidation treatment, for example, by passing a stream of air or air diluted with flue gases over the same under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, particularly, between 0.3 second and 30 seconds. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid hydrocarbon reactant per volume of catalyst per hour. Accordingly, we have found that the space velocities may be varied considerably and that velocities varying between about one to about 4 are quite satisfactory for the purposes of the present invention.

In general, the temperatures to be used in our process vary between about 850° F. and up to the decomposition temperature of ammonia (about 1250–1300° F.), and preferably, temperatures varying between about 925° F. and about 1075° F. The preferred temperature to be used in any particular operation will depend upon the nature of hydrocarbon reactant used and upon the type of catalyst employed. Generally speaking, the higher temperatures increase the conversion per pass but they also increase the decomposition of the reactants thereby decreasing the ultimate yields of nitriles. Accordingly, the criteria for determining the optimum temperature to be used in any particular operation will be based on the nature of the hydrocarbon reactant, the type of catalyst, and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that the unreacted charge materials condense more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or moderately subatmospheric or superatmospheric pressures are preferred.

At the present time, the reaction mechanism involved in the process of the present invention is not fully understood. Fundamentally, the simplest possible method of making, for example, aromatic nitriles is to introduce nitrogen directly into the alkyl radical of the alkyl aromatic hydrocarbon molecule, thereby avoiding intermediate steps with their accompanying increased cost. In our process, we have noted that considerable amounts of hydrogen are evolved; hence, it is postulated, without any intent of limiting the scope of the present invention, that the aromatic nitriles, for example, are formed in accordance with the following equations, using toluene and xylene as examples:

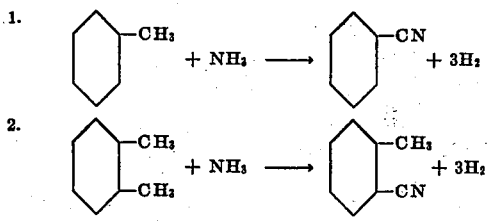

The present process may be carried out by making use of any of the well-known techniques for operating catalytic reactions in the vapor phase effectively. By way of illustration, toluene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or counter-currently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of benzonitrile, hydrogen, unchanged toluene, and unchanged ammonia. The benzonitrile and the unchanged toluene will be condensed in passing through the condensing zone and will be retained in the receiving chamber. Benzonitrile can be separated from the unchanged toluene by any of the numerous and well known separation procedures, such as fractional distillation. Similarly, the uncondensed hydrogen and unchanged ammonia can be separated from each other by scrubbing the gases with acid. The unchanged toluene and ammonia can be recycled, with or without fresh toluene, and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific alkyl aromatic hydrocarbon reactants or to the specific catalyst disclosed hereinafter or to the manipulations and conditions set forth in the examples. As it will be apparent to those skilled in the art, a wide variety of other nitriles may be prepared by a suitable modification of the hydrocarbons reactants.

A reactor, containing 100 parts by weight of catalyst comprising 10 parts by weight of molybdenum trioxide supported on 90 parts by weight of alumina, was used in each of the runs. Ammonia and various alkyl aromatic hydrocarbons were introduced in the vapor phase into the reactor for 45 minutes. The reaction mixture was passed from the reactor, through a condenser, into a receiving chamber. Hydrogen and unchanged ammonia were separated from each other by continuous scrubbing with acid during the run, and the hydrogen was collected in a gas holder. The nitriles and the unchanged alkyl aromatic hydrocarbons remained in the receiving chamber and were subsequently separated by distillation. The pertinent data and the results of each run are tabulated in Table I.

Table I

| Example No. | Alkyl Aromatic Hydrocarbon Reactant | Temperature in °F. | Liquid Space Velocity | Mol Ratio Ammonia to Hydrocarbon | Yield Per cent Vol. of Charge | Nitrile Formed |
|---|---|---|---|---|---|---|
| 1 | Toluene | 995 | 3.11 | 2.3 | 6.8 | Benzonitrile. |
| 2 | Xylene | 970 | 3.38 | 2.0 | 7.2 | Tolunitrile. |
| 3 | Trimethyl Benzenes | 979 | 3.03 | 1.9 | 8.6 | Xylylnitrile. |

In the following runs, the hydrocarbon reactant was an aromatic hydrocarbon fraction having a boiling range of 320–340° F. This fraction was obtained from a thermally cracked naphtha and comprised largely trimethyl benzenes. The nitriles formed in these runs were xylyl nitriles. The pertinent data of each of these runs are tabulated in Table II.

Table II

| Example No. | 1 | 2 | 3 | 4 | 5 | 6 | 7 |
|---|---|---|---|---|---|---|---|
| Temperature in °F | 930 | 962 | 1023 | 980 | 963 | 963 | 980 |
| Liquid Space Velocity | 3.04 | 3.06 | 2.95 | 3.16 | 3.14 | 1.93 | 4.04 |
| Mol Ratio, Ammonia to Hydrocarbon | 1.90 | 1.94 | 2.00 | 2.80 | 0.95 | 2.07 | 1.95 |
| Yield, Per Cent Vol. of Hydrocarbon | 4.45 | 7.25 | 8.67 | 5.72 | 7.15 | 9.70 | 5.42 |

It will be apparent that the present invention provides an efficient, inexpensive and safe process for obtaining nitriles, particularly those of the benzene series. Our process is of considerable value in making available relatively inexpensive nitriles which are useful, for example, as intermediates in organic synthesis.

This application is a continuation-in-part of copending application Serial Number 509,774, filed November 10, 1943, now abandoned.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. A process for the production of aromatic nitriles, which comprises contacting an aromatic hydrocarbon containing at least seven and up to eleven, inclusive, carbon atoms per molecule, and having at least one nuclear hydrogen replaced by a univalent, aliphatic, non-acetylenic hydrocarbon radical, with ammonia, in gaseous phase, at temperatures falling within the range varying between about 850° F. and about 1250° F., in the presence of a catalyst comprising a molybdenum oxide.

2. A process for the production of aromatic nitriles, which comprises contacting an aromatic hydrocarbon containing at least seven and up to eleven, inclusive, carbon atoms per molecule, and having at least one nuclear hydrogen replaced by a univalent, aliphatic, non-acetylenic hydrocarbon radical, with ammonia, in gaseous phase, at temperatures falling within the range varying between about 925° F. and about 1075° F., in the presence of a molybdenum oxide supported on a catalyst support.

3. A process for the production of aromatic nitriles, which comprises contacting an aromatic hydrocarbon containing at least seven and up to eleven, inclusive, carbon atoms per molecule, and having at least one nuclear hydrogen replaced by a univalent, aliphatic, non-acetylenic hydrocarbon radical, with ammonia, in gaseous phase, at temperatures falling within the range varying between about 925° F. and about 1075° F., in the presence of molybdenum trioxide supported on alumina.

4. A process for the production of aromatic nitriles, which comprises contacting a methyl-substituted aromatic hydrocarbon containing at least seven and up to eleven, inclusive, carbon atoms per molecule, with ammonia, in gaseous phase, at temperatures falling within the range varying between about 850° F. and about 1250° F., in the presence of a catalyst comprising a molybdenum oxide.

5. A process for the production of aromatic nitriles, which comprises contacting a methyl-substituted aromatic hydrocarbon containing at least seven and up to eleven, inclusive, carbon atoms per molecule, with ammonia, in gaseous phase, at temperatures falling within the range varying between about 925° F. and about 1075° F., in the presence of a molybdenum oxide supported on a catalyst support.

6. A process for the production of aromatic nitriles, which comprises contacting a methyl-substituted aromatic hydrocarbon containing at least seven and up to eleven, inclusive, carbon atoms per molecule, with ammonia, in gaseous phase, at temperatures falling within the range varying between about 925° F. and about 1075° F., in the presence of molybdenum trioxide supported on alumina.

7. A process for the production of aromatic nitriles of the benzene series, which comprises contacting a methyl-substituted benzene with ammonia, in gaseous phase, at temperatures falling within the range varying between about 850° F. and about 1250° F., in the presence of a catalyst comprising a molybdenum oxide.

8. A process for the production of aromatic nitriles of the benzene series, which comprises contacting a methyl-substituted benzene with ammonia, in gaseous phase, at temperatures falling within the range varying between about 925° F. and about 1075° F., in the presence of a molybdenum oxide supported on a catalyst support.

9. A process for the production of aromatic nitriles of the benzene series, which comprises contacting a methyl-substituted benzene with ammonia, in gaseous phase, at temperatures falling within the range varying between about 925° F. and about 1075° F., in the presence of molybdenum trioxide supported on alumina.

10. A process for the production of benzonitrile, which comprises contacting toluene with ammonia, in gaseous phase, at temperatures falling within the range varying between about 925° F. and about 1075° F., in the presence of molybdenum trioxide supported on alumina.

11. A process for the production of aromatic nitriles of the benzene series, which comprises contacting a xylene with ammonia, in gaseous phase, at temperatures falling within the range varying between about 925° F. and about 1075° F., in the presence of molybdenum trioxide supported on alumina.

12. A process for the production of aromatic nitriles of the benzene series, which comprises contacting a trimethyl benzene with ammonia, in gaseous phase, at temperatures falling within the range varying between about 925° F. and about 1075° F., in the presence of molybdenum trioxide supported on alumina.

HAMILTON P. CALDWELL, Jr.
HAROLD D. CHAPMAN.

REFERENCES CITED

The following references are of record in the file of this patent:

UNITED STATES PATENTS

| Number | Name | Date |
|---|---|---|
| 1,920,795 | Jaeger | Aug. 1, 1933 |
| 2,331,968 | Forney | Oct. 19, 1943 |
| 2,381,709 | Apgar et al. | Aug. 7, 1945 |

Certificate of Correction

Patent No. 2,450,632. October 5, 1948.

HAMILTON P. CALDWELL, Jr., ET AL.

It is hereby certified that error appears in the printed specification of the above numbered patent requiring correction as follows:

Column 2, line 19, for the words "carbon to" read *carbon atom to*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*